(12) United States Patent
Curry et al.

(10) Patent No.: US 9,122,878 B1
(45) Date of Patent: Sep. 1, 2015

(54) SOFTWARE LICENSE MANAGEMENT WITH DRIFTING COMPONENT

(75) Inventors: Samuel J. Curry, North Andover, MA (US); Marten Van Dijk, Somerville, MA (US)

(73) Assignee: EMC Corporation, Hopkinton, MA (US)

( * ) Notice: Subject to any disclaimer, the term of this patent is extended or adjusted under 35 U.S.C. 154(b) by 372 days.

(21) Appl. No.: 13/535,834

(22) Filed: Jun. 28, 2012

(51) Int. Cl.
  *H04L 29/00* (2006.01)
  *G06F 21/57* (2013.01)

(52) U.S. Cl.
  CPC .................................. *G06F 21/577* (2013.01)

(58) Field of Classification Search
  None
  See application file for complete search history.

(56) References Cited

U.S. PATENT DOCUMENTS 6,026,166 A     2/2000   LeBourgeois
6,802,447 B2 *  10/2004  Horng ........................... 235/375
7,876,900 B1 *  1/2011   Goergen ....................... 380/255
2014/0108803 A1 * 4/2014 Probert ......................... 713/170

OTHER PUBLICATIONS

Juels et al., "Key Update With Compromise Detection," U.S. Appl. No. 13/250,225, filed Sep. 30, 2011.

* cited by examiner

*Primary Examiner* — Brandon Hoffman
*Assistant Examiner* — Helai Salehi
(74) *Attorney, Agent, or Firm* — BainwoodHuang

(57) ABSTRACT

An improved technique for verifying a license of a software product includes performing license checks with a server and passing to the server, as part of the license checks, a drifting digital code. The drifting code forms a particular drift pattern, which the server detects over the course of multiple license checks. The drift pattern is typically unique, or relatively unique, to the machine on which the software product is run, and changes in a manner that is difficult for malicious users to replicate on other machines. If a second copy of the software is installed, e.g., if the software is pirated, the second copy will produce a drifting code that has its own drift pattern, which differs from that of the initial copy. The server detects the duplicate copy by observing a divergence in the codes it receives during license checks.

22 Claims, 5 Drawing Sheets

SOFTWARE LICENSE MANAGEMENT WITH DRIFTING COMPONENT

BACKGROUND

Many software products make use of license verification processes to ensure effective license enforcement. According to one conventional license verification process, a medium containing a licensed software product is provided with a product key, such as a 16-character string printed on a sticker affixed to the medium or its packaging. The product key has a structure that matches a predetermined schema. During software installation, a user is prompted to enter the product key, e.g., on a keyboard of the user's computer. The software tests the entered key to determine whether it conforms to the predetermined schema. If the product key meets the schema, full functionality of the software may be unlocked and the user may gain access. If the product key does not meet the schema, the software, or certain features of the software, may remain locked and therefore inaccessible to the user.

According to another conventional license verification process, the software on a user's machine is configured to communicate online with a server, such as an activation server or a registration server. Hardware information about the user's machine is gathered, such as the machine's MAC address. The user enters a product key, and the product key is uploaded to the server along with the gathered hardware information. If an attempt is later made to activate or register the software using the same product key on a different machine, the server can detect a discrepancy in the hardware information and flag a duplicate copy. Additional steps may then be taken to ascertain whether the duplicate copy is allowed under the license and what actions should be taken if the duplicate copy is forbidden.

Some conventional software products perform license verifications rarely, such as only when the software is registered or activated. Other conventional software products perform license verifications more regularly, such as every time the software product is started.

SUMMARY

Unfortunately, many conventional approaches for verifying software licenses can be defeated. For example, where a software product requires an entered product key to match a particular schema, any number of unauthorized copies can be made by someone having both the installation medium for the software product and a product key that meets the schema.

Similarly, license verification that relies on contacting an online server can often be defeated by bypassing the part of the application that checks for the license. Also, in some cases, fraudsters can obtain the hardware-specific information used to authenticate the license, e.g., by accessing the user's computer, either directly or through the use of malware, and can provide the ill-gotten hardware information to the server using code that impersonates the application.

In contrast with these prior approaches, which can be defeated if certain software or machine-specific information is obtained, an improved technique for verifying a license of a software product includes performing license checks with a server and passing to the server, as part of the license checks, a drifting digital code. The drifting code forms a particular drift pattern, which the server detects over the course of multiple license checks. The drift pattern is typically unique, or relatively unique, to the machine on which the software product is run, and changes in a manner that is difficult to replicate on another machine. If a second copy of the software is installed, e.g., if the software is pirated, the second copy will produce a drifting code having its own drift pattern, which differs from that of the initial copy. The server detects the duplicate copy by observing a divergence in the codes it receives during license checks. For example, the drift pattern that emerges from the codes produced by the original copy will be seen to split into two paths after the second copy comes online. The server detects the divergence and can take action, such as blocking operation of the software and/or informing the producer of the software product that a duplicate copy was detected.

Certain embodiments are directed to a method of verifying a license of a software product that runs on a client machine. The method includes updating a digital code at different times to produce a sequence of digital code values that exhibit a detectable drift pattern over time. The method further includes sending at least some of the digital code values to a licensing server to perform license checks of the license of the software product. Upon at least one of the license checks, the method includes receiving a message from the licensing server confirming a valid licensed copy of the software product on the client machine, in response to the licensing server detecting no more than one drift pattern among the digital code values the licensing server has received in connection with the license.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is not limited to the specific embodiments disclosed.

An improved technique for verifying a software license includes performing license checks with a server and passing to the server, as part of the license checks, a drifting digital code. The drifting code forms a particular pattern, which the server detects over the course of multiple license checks. If a second copy of the software is installed, e.g., if the software is pirated, the second copy will produce a code having its own drift pattern, which differs from that of the initial copy. The server can detect the duplicate and take appropriate action.

Figure 1:
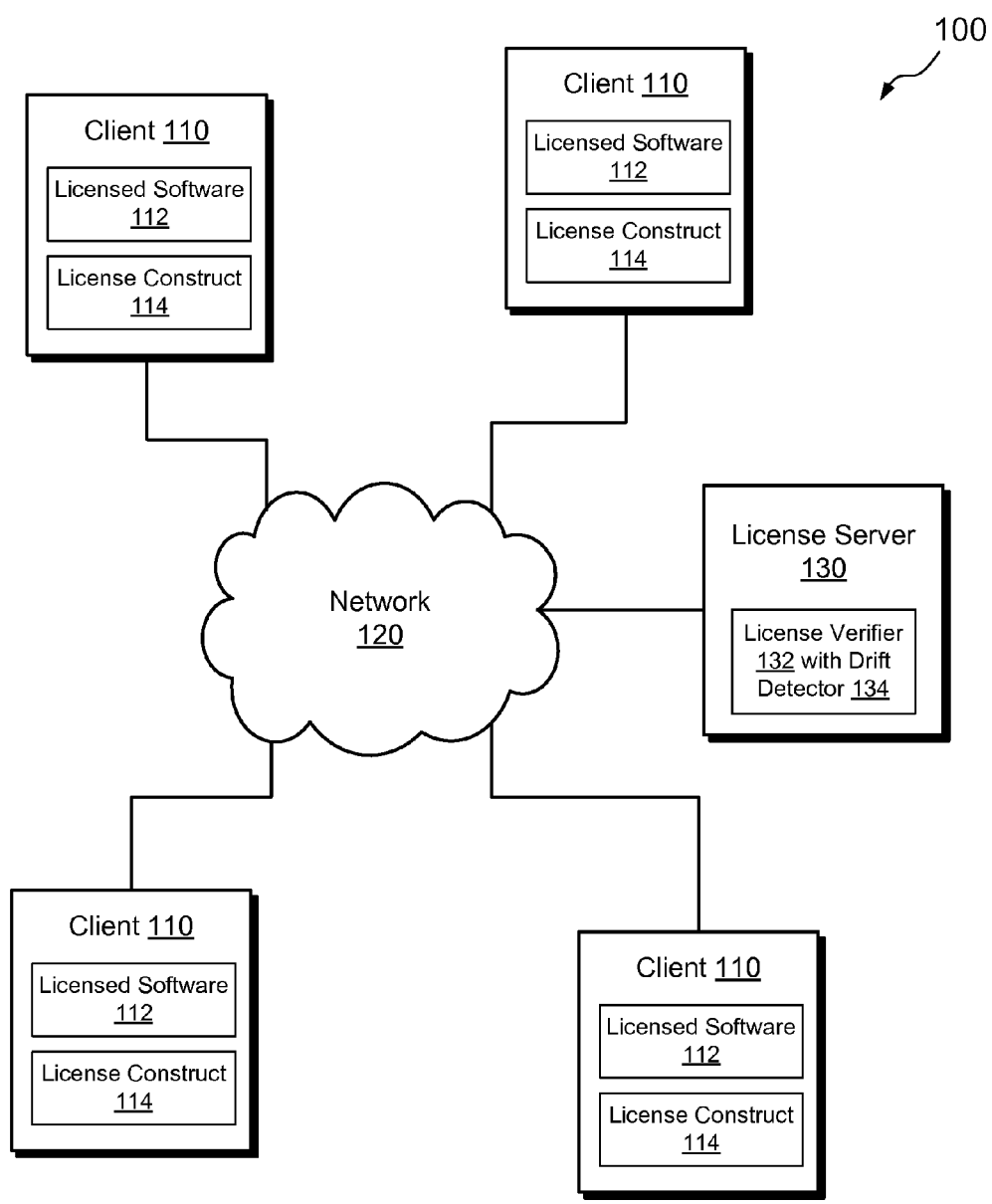
FIG. 1 is a block diagram of an example electronic environment, which includes a license server and multiple client machines arranged for carrying out techniques according to embodiments of the invention.

FIG. 1 shows an example electronic environment 100 in which improved techniques for verifying software licenses are practiced. As shown, the electronic system 100 includes various client machines 110 connected to a license server 130 over a network 120, such as the Internet, a local area network (LAN), a wide area network (WAN), or some other network or combination of networks. The client machines 110 can be any type of computing machines, including desktop computers, laptop computers, smart phones, PDAs, tablets, personal readers (e.g., Kindles, Nooks, etc.), or television set-top boxes, for example. The client machines 110 can be physical machines or virtual machines. The client machines 110 need not be of a single type. Rather, different client machines 110 can employ different hardware and/or software. Any number of client machines 110 can be provided.

The client machines 110 are each provided with a licensed software product 112 and a license construct 114. The licensed software product 112 can be any type of software product that operates under terms of a license, such as an application, platform, tool, utility, or the like, for example. The licensed software product 112 can also be a licensed medium or media rendered as software for use on a client machine 110, such as a game, book, movie, picture, music selection, newspaper, magazine, or broadcast item, for example. In some examples, the licensed software product 112 is stored directly on a client machine 110 (e.g., on a disk drive or other non-volatile storage medium). In other examples, the licensed software product 112 is stored elsewhere and copied or streamed to the client machine 110, e.g., over the Internet from some other server.

The license construct 114 runs on a client machine 110 and performs license checks with the license server 130 to verify that the software product 112 on the client machine 110 is authorized for use under the terms of its license. The license construct 114 of each client machine 110 produces a drifting digital code in connection with the respective licensed software product 112. The license server 130 can inspect the drifting code to detect whether duplicate installations of the software product 112, such as pirated copies, have been installed on any of client machines 110.

The license server 130 includes a license verifier 132 for verifying licenses of the software products 112 running on the client machines 110. The license verifier 132 includes a drift detector 134. The drift detector 134 inspects the drifting codes received from the client machines 110 during license checks to verify that only a single drift pattern is detected for each software license. Although only a single computing device is shown for the license server 130, it is understood that the license server 130 may be implemented with any number of computing devices, which operate in coordination with one another.

In example operation, a user of a client machine 110 starts the licensed software product 112 on the client machine 110, such as by double-clicking or tapping an icon. In some examples, certain functions or capabilities of the licensed software product 112 are initially disabled and are enabled only upon successful license verification. As the licensed software product 112 starts, the licensed software product 112 alerts the license construct 114 of the client machine 110, which then sends the license server 130 a license validation request. The request includes a license identifier (e.g., a unique license key) as well as an updated value of the drifting code maintained by the license construct 114. The license server 130 receives the request, and the license verifier 132 accesses a record of prior values of the drifting code that have previously been stored in connection with the license identifier. The drift detector 134 appends the updated value of the drifting code to the record of drifting codes stored in connection with the same license identifier and evaluates the appended record to detect whether multiple drift patterns are present.

If the drift detector 134 does not detect multiple drift patterns, and assuming all other licensing checks (if any) are verified, the license server 130 sends a response to the client machine 110 (the one that originated the request) to indicate that the license check has passed. The client machine 110 may then unlock or otherwise enable full operation of the licensed software product 112.

If, however, the operation of the drift detector 134 reveals multiple drift patterns, then various actions may be performed as appropriate under the circumstances. In some instances, the license server 130 sends a response to the client 110 indicating that the license check has failed. The client 110 can then disable full operation of the licensed software product 112. In some instances, the license server 130 accesses a database of licensees and contacts the licensee for which the duplicate was detected to offer a new license for an additional fee. In some cases, the particular license allows a certain number of duplicate copies, and the license 130 server sends a passing response to the client machine 110 as long as the allowed number of license copies (as measured by the number of distinct drift patterns) has not been exceeded. In some cases, efforts may be made to enforce a violated license through legal measures.

It is understood that the example electronic environment 100 is merely illustrative. Various alternative arrangements are contemplated. For example, some client machines 110 can include multiple license constructs 114 for validating licenses of multiple, respective licensed software products 112. Also, multiple license servers 130 can be provided, with different servers validating the licenses of different licensed software products 112. In addition, a single license construct 114 can be configured on a client machine 110 to validate the licenses of multiple licensed software products 112 on that client machine 110. In an example, such a license construct 114 can maintain different drifting codes in association with different licensed software products 112. The different drifting codes can initially be computed based on different factors and can be updated using different techniques.

Figure 2:
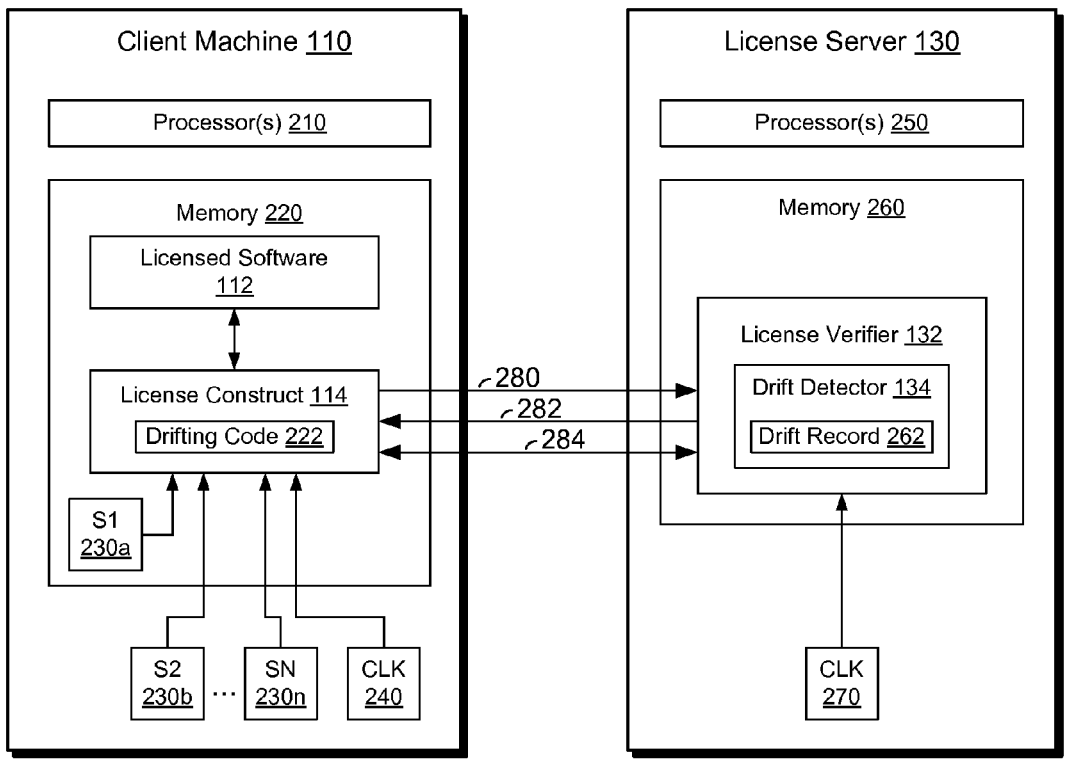
FIG. 2 is a more detailed block diagram of the example license server and one of the example client machines of FIG. 1.

FIG. 2 shows an example client machine 110 and an example license server 130 in additional detail. Here, it is seen that the client machine 110 includes a set of processors 210 (e.g., one or more processing chips and/or assemblies) and memory 220 (e.g., both volatile and non-volatile memory). In the example shown, the memory 220 stores a single licensed software product 112 and a single license construct 114 (although greater than one of each can be provided, as described above). The license construct 114 stores a drifting code 222.

The client machine 110 is also seen to include various information sources 230a-n (S1-SN) and a clock 240. The information sources 230a-n provide system posture information of the client machine 110, e.g., any combination of hardware information, software information, environmental information, and/or behavioral information pertinent to the client machine 110. The posture information forms a pattern that is reasonably unique, if not completely unique, to the client machine 110. By "reasonably unique," it is meant that the probability of any two related client machines 110 having the same pattern is low, even though certain client machines 110 may have the same or similar patterns. Another example of a reasonably unique identifier is the ubiquitous four-digit Personal Identification Number (PIN) used in on-line banking. The chances of any two closely related people having the same PIN are low, even though many people worldwide surely have the same PIN, as the four-digit code only provides ten thousand unique possibilities.

In some examples, an initial value of the drifting code 222 is computed from data from the information sources 230a-n. Also, in some examples, updates to the drifting code 222 are computed based on changes in the data from the information sources 230a-n, as the information sources 230a-n change with age.

The license server 130 is seen to include its own set of processors 250 (e.g., one or more processing chips and/or assemblies) and memory 260 (e.g., both volatile and non-volatile memory). The memory 260 of the license server 130 stores the license verifier 132, which includes the drift detector 134. It is understood that the drift detector 134 can alternatively be provided as a separate construct from the license verifier 132. The drift detector 134 stores a drift record 262, which holds a record of drifting codes 222 received in connection with the licensed software product 112. The license server 130 also includes a clock 270.

Upon a first license check of the licensed software 112 by the client machine 110, and in some examples before the first license check, the license construct 114 of the client machine 110 generates an initial value of the drifting code 222, preferably from the data of the information sources 230a-n. Thereafter, each time a license check is performed, or on some other schedule, the license construct 114 updates the drifting code 222. In some examples, the updated values of the drifting code 222 reflect changes in the underlying information sources 230a-n. Also, or in combination with changes in the underlying information sources 230a-n, updated values of the drifting code 222 reflect the operation of a computing technique that changes the value of the drifting code over time and/or for different license checks.

For each license check, the license construct 114 sends a request 280 to the license server 230, requesting validation of the license for the software product 112. The request 280 includes, for example, the drifting code 222 as well as a license identifier, such as a license key, which uniquely identifies the license of the software product 112. The license verifier 132 receives the request 280 and retrieves the drift record 262 for the license identified by the license identifier.

The drift detector 134 then appends the new value of the drifting code 222 to the drift record for the identified license and examines the updated drift record 262 to test whether the drift record 262 reveals a single drift pattern or multiple drift patterns. The license verifier 132 sends a response 282 back to the license construct 114 of the client machine 110. The response 282 may indicate a passing result (e.g., when only a single drift pattern is found), in which case the client machine 110 allows full operation of the licensed software product 112. The response 282 may alternatively indicate a failing result (e.g., when multiple drift patterns are found), in which case the client machine 110 may deny full operation of the licensed software product 112. Other actions may be taken, as appropriate under the circumstances.

In some examples, the client machine 110 and the license server 130 communicate, e.g., via a pathway 284, to exchange additional information relative to license checks. For instance, the license server 130 may direct the license construct 114 to encrypt requests 280 in a particular way or to update the drifting code 222 in a particular manner or at a particular rate. Although the request 280, response 282, and pathway 284 are shown as distinct elements, those skilled in the art will recognize that these elements are typically implemented as distinct communications over a communication medium using a protocol, such as TCP/IP, and that the elements 280, 282, and 284 are not intended to represent physically distinct structures.

As indicated, the initial value of the drifting code 222 is preferably computed based on information provided by the information sources 230a-n. In an example, the information sources 230a-n each provide a factor that contributes to an overall result that is specific to the client machine 110. The result is computed from the different factors and is applied, either directly or through additional processing, to produce the initial value of the drifting code 222.

In some examples, certain of the information sources 230a-n are provided in the form of hardware fingerprints of various hardware components of the client machine 110, such as a network interface card (NIC) and/or a graphics processing unit (GPU). In some examples, certain of the information sources 230a-n relate to performance measures of the client machine 110. Example performance measures include the temperature of any of the client machine's integrated circuits, the electrical current drawn from its power supply, or the results of race conditions established to identify the faster of multiple propagation paths. In some examples, certain of the information sources 230a-n are provided by software constructs. Particularly useful software constructs for this purpose include those that persist their state over time and change gradually. Where the client machine 110 is implemented as a virtual machine (i.e., one defined by its software state and not bound to any particular hardware), hardware signatures and measured performance values can be obtained from emulated hardware of the virtual machine. In some examples, certain of the information sources 230a-n provide data in the form of environmental factors, such as the identities of WiFi beacons or BlueTooth devices within a vicinity of the client machine 110, or the identities of peripheral devices connected to the client machine 110. Other information sources 230a-n provide data relating to behavioral patterns, such as times of use of the client machine 110 and web browsing habits of users of the client machine 110.

The value of the drifting code 222 is updated in response to particular events. In some examples, the events are intervals of time. For example, the value of the drifting code 222 may be updated once per week, once per day, or once per hour, as measured by the clock 240. In other examples, the drifting code 222 is updated in response to the licensed software product 112 being registered and/or activated. In some examples, the drifting code 222 is updated every time the licensed software product 112, or an instance thereof, is started on the client machine 110. In some examples, the update schedule for the drifting code 222 is based at least in part on feedback from the license server 130 over the pathway 284. In some examples, updates to the drifting code 222 are incremental, where each change in the value of the drifting code 222 is relatively small compared with the total information content of the drifting code 222.

Preferably, the value of the drifting code 222 changes at an approximately constant rate. Thus, a magnitude of the change in the value of the drifting code 222 over any given interval of time is approximately the same, regardless of the number of license checks performed during that interval. Changing the magnitude of the value of the drifting code 222 at a constant rate over time allows the license server 130 to detect various circumstances that might otherwise go unnoticed. For example, where the client machine 110 is a virtual machine, certain users, including some malicious users, can operate the client machine 110 at an accelerated rate, to reveal problems or to observe behavior that would normally require a great deal of time to witness. When the value of the drifting code 222 is updated at a constant rate relative to the clock 240 of the client machine 110, the license server 130 can observe that the value of the drifting code 222 changes faster than expected relative to its own clock 270. The license server 130 can then conclude that the client machine 110 is operating in an accelerated environment. Under such circumstances, the accelerated environment of the client machine 110 should also produce more frequent license checks. If the license server 130 receives license checks at a normal rate, however, the license server 130 may raise an alarm, as the absence of expected license checks may signal malicious manipulation of the license construct 114 by a user.

In some examples, the change and rate of change in the value of the drifting code 222 are established at least in part by the changes and rates of change of the underlying information sources 230a-n from which the drifting code 222 is initially derived. In other examples, an algorithm is applied to change the value of the drifting code 222 in a computed fashion, e.g., by changing some number of bits of the drifting code 222 randomly at a constant rate, and/or by weighting changes in data obtained from the information sources 230a-n to maintain an approximately constant rate of change in the value of the drifting code 222 relative to the clock 240.

Although maintaining an approximately constant drift rate is preferable in many instances, it is not strictly required. It is expected that the hardware, software, environment, and/or behavior of the client machine 110 may change over time. To the extent that the value of the drifting code 222 is based on information sources 230a-n that can change abruptly, the value of the drifting code 222 itself can change abruptly.

Also, the rate of change of the drifting code 222 can be altered in response to changes in the activities of the licensed software product 112. For example, the license construct 114 can communicate with the licensed software product 112 and update the drifting code 222 at different rates depending on the activities performed by the licensed software product 112. In one example, the rate of change of the drifting code 222 is increased when the licensed software product 112 performs activities on sensitive data. Further, the rate of change of the drifting code 222 can be adjusted based on feedback from the license server 130, e.g., over the pathway 284.

Figure 3:
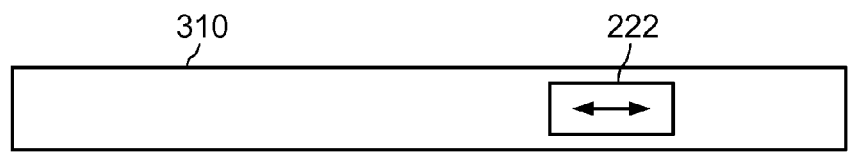
FIG. 3 is a diagram of an example license key used for verifying a license of a software product, where the license key includes a drifting digital code that can be placed at different locations within the license key and whose value can be made to drift over the course of multiple license checks.

FIG. 3 shows an example license identifier 310, which the license construct 114 can send to the license server 130 as part of a license request 280. The license identifier 310 uniquely identifies the license of the software product 112. Rather than the request 280 providing the license identifier 310 and the current value of the drifting code 222 separately, the request 280 preferably combines the license identifier 310 and drifting code 222 in a manner that makes it difficult for malicious observers to detect the drifting code 222. For example, the license construct 114 preferably varies the position of the drifting code 222 within the license identifier 310 on different license checks. The license construct 114 preferably also encrypts the combined code string prior to sending the request 280. The combination of encryption with the changing position of the drifting code 222 within the license identifier 310 for different license checks creates a very difficult problem for a malicious observer attempting to discover the drifting code 222. The license server 130, however, has the information it needs to decrypt the code string and determine the position of the drifting code 222 within the license identifier 310, and thus can properly separate the drifting code 222 from the license identifier 310 once the request 280 is received.

In some examples, the position of the drifting code 222 within the license identifier 310 is established by an algorithm that receives time from the clock 240 as input. In other examples, the position of the drifting code 222 within the license identifier 310 is prescribed by the license server 130 and communicated to the license construct 114 via the pathway 284.

It is understood that the license identifier 310 and the drifting code 222 can be of any length. Also, although the drifting code 222 as shown in FIG. 3 appears smaller than the license identifier 310, this is merely an example. Alternatively, the drifting code 222 can be the same size or larger than the license identifier 310.

Figure 4A:
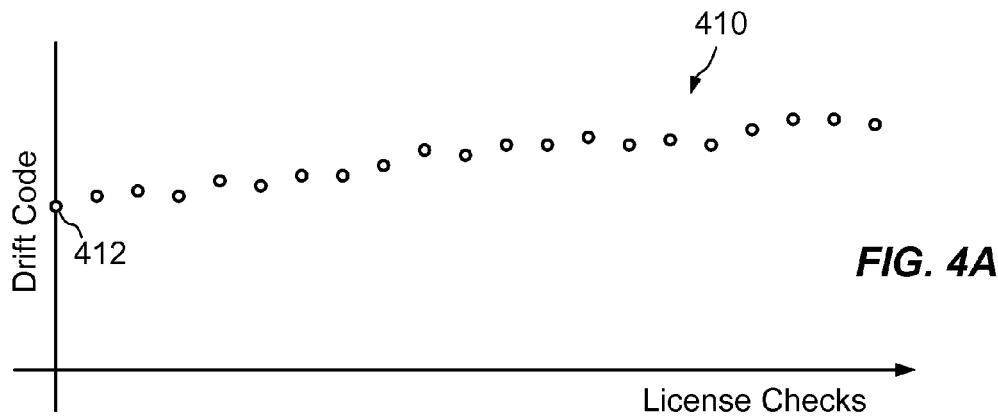
FIG. 4A shows an example graphical representation of the drifting digital code of FIG. 3, as seen by the server of FIGS. 1-2, when only a single client machine performs license checks with the server.
Figure 4B:
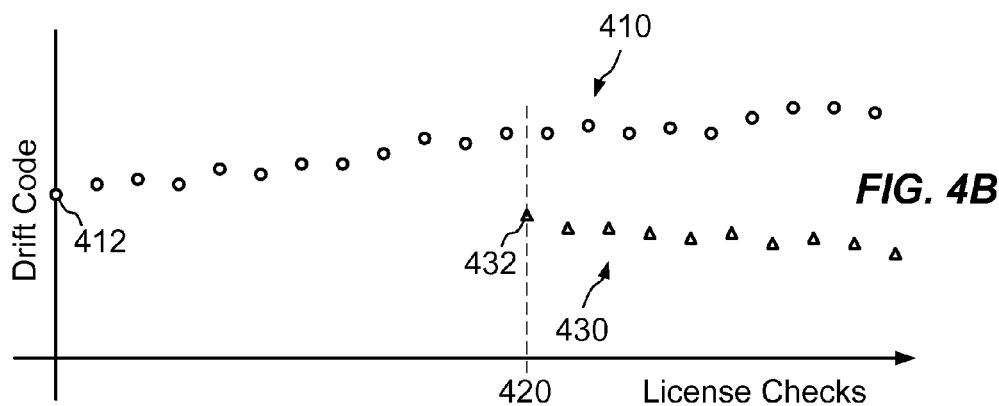
FIG. 4B shows an example graphical representation of the drifting digital code of FIG. 3, as seen by the server of FIGS. 1-2, when two different client machines perform license checks on the software product under the same license and wherein initial values of the digital drifting codes used by the respective machines are different.
Figure 4C:
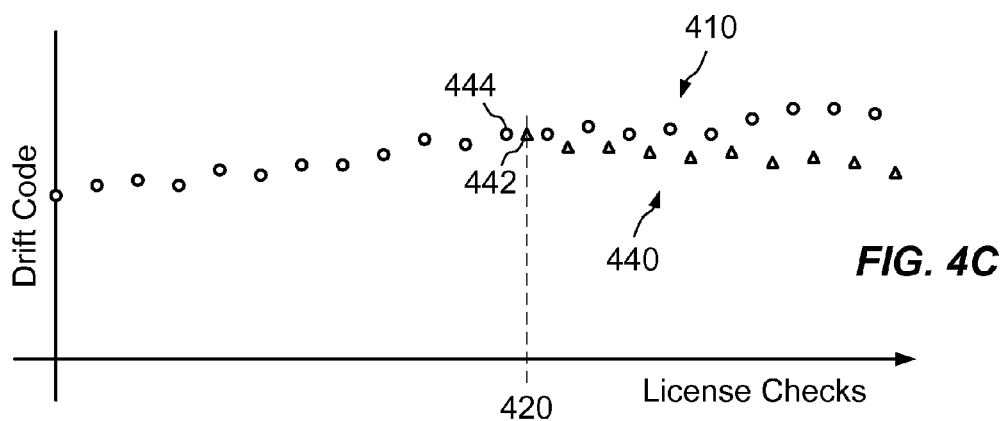
FIG. 4C shows an example graphical representation of the drifting digital code of FIG. 3, as seen by the server of FIGS. 1-2, when two different client machines perform license checks on the same licensed copy of a software product, where the initial value of the drifting code of a second copy is one of the values of the drifting code of the original copy.

FIGS. 4A, 4B, and 4C show example sequences of values of the drifting code 222 in three different scenarios. For each scenario, the values of the drifting code 222 reflect what is stored in the drift record 262 and examined by the drift detector 134 of the license server 130.

FIG. 4A shows a sequence 410 of values of the drifting code 222 originating from a single installation of the licensed software product 112 on a single client machine 110. Each value of the sequence 410 is received as part of a respective request 280 during a license check. The sequence 410 of values are arranged in the order that the license server 130 receives them.

The sequence 410 is seen to have an initial value 412. In a manner already described, the initial value 412 may be computed by combining data from the information sources 230a-n. On successive license checks, the updated values of the drifting code 222 are seen to drift incrementally from one value to the next. In some examples, changes in the values of the drift code 222 have a random component, or may be entirely random. In some examples, changes in the value of the drift code 222 are non-random but are based upon processes that are difficult for an observer to predict. The sequence 410 is seen to follow a recognizable drift pattern. The drift detector 134 performs a pattern analysis on the drifting code values it receives and identifies a single distinct pattern. The license verifier 132 can then send responses 282 indicating that license verification was successful (assuming other licensing tests, if any, pass).

FIG. 4B shows the same sequence 410, which reflects the same activity performed on the same client machine 110 as in FIG. 4A. In this case, however, a duplicate copy of the license software product 112 has been installed on a second client machine 110. Each time a user of the second client machine 110 attempts to run the software product 112, or on some other schedule, a license check is performed. A first such license check 420 includes an initial value 432 of the drifting key of the second client machine 110. However, as the second client machine 110 receives different values from its information sources 230a-n (e.g., owing to different hardware, software, environment, and/or behavior), the initial value 432 of the drifting code 222 of the second client machine is different from the initial value 412 of the original client machine 110. Also, the drift pattern formed by the sequence 430 is clearly different from the drift pattern 410. The drift detector 134 performs a pattern analysis on the drifting code values it receives (i.e., those of both sequences 410 and 430) and identify two distinct patterns. The license verifier 132 then takes appropriate action in passing or failing license checks, depending on the number of copies allowed under the license, and in some cases other factors.

It is evident that in this scenario that the drift detector 134 can not only detect multiple drift patterns, but also can identify whether any given license check is associated with the original client machine 110 or with the second client machine 110. The license server 130 thus has a mechanism for differentiating between authorized licensees and potential pirates. In responding to license checks, the license server 130 can therefore respond with passing results to license checks arriving with drift codes that align with the pattern of the original machine, but can respond with failing results when the drift codes align with the pattern of the second client machine 110.

FIG. 4C shows a scenario similar to that of FIG. 4B, but in this case the software pirate is smarter and has somehow managed to obtain a current value of the drifting code 222 of the original client machine 110. An initial value 442 of the drifting code of the second client machine 110 is thus the same as a previous value 444 of the drifting code used by the original client machine 110 during the immediately prior license check. It is shown, however, that the sequence 440 of drifting code values of the second client machine 110 still does not track the sequence 410 of the original client machine 110. For example, updates to the drifting key 222 of the second client machine 110 follow a different course based on changes in data provided by the information sources 230a-n of the second client machine 110, which are different from the data provided by the information sources 230a-n of the original client machine 110. Over the course of just a few license checks, the drift detector 134 clearly identifies two distinct drift patterns. License checks will then fail or otherwise be dealt with appropriately.

It is understood that the drifting code values in the sequences 410, 430, and 440 are shown as one-dimensional values for purposes of simple illustration. Embodiments may include drifting codes expressed in a variety of ways, however. In some examples, drifting code values have multiple dimensions, such as one dimension for each of the information sources 230a-n. Also, although the examples shown in FIGS. 4A-4C pertain to at most two copies of the software product 112, it is understood that the approach can be applied to any number of copies.

Figure 5:
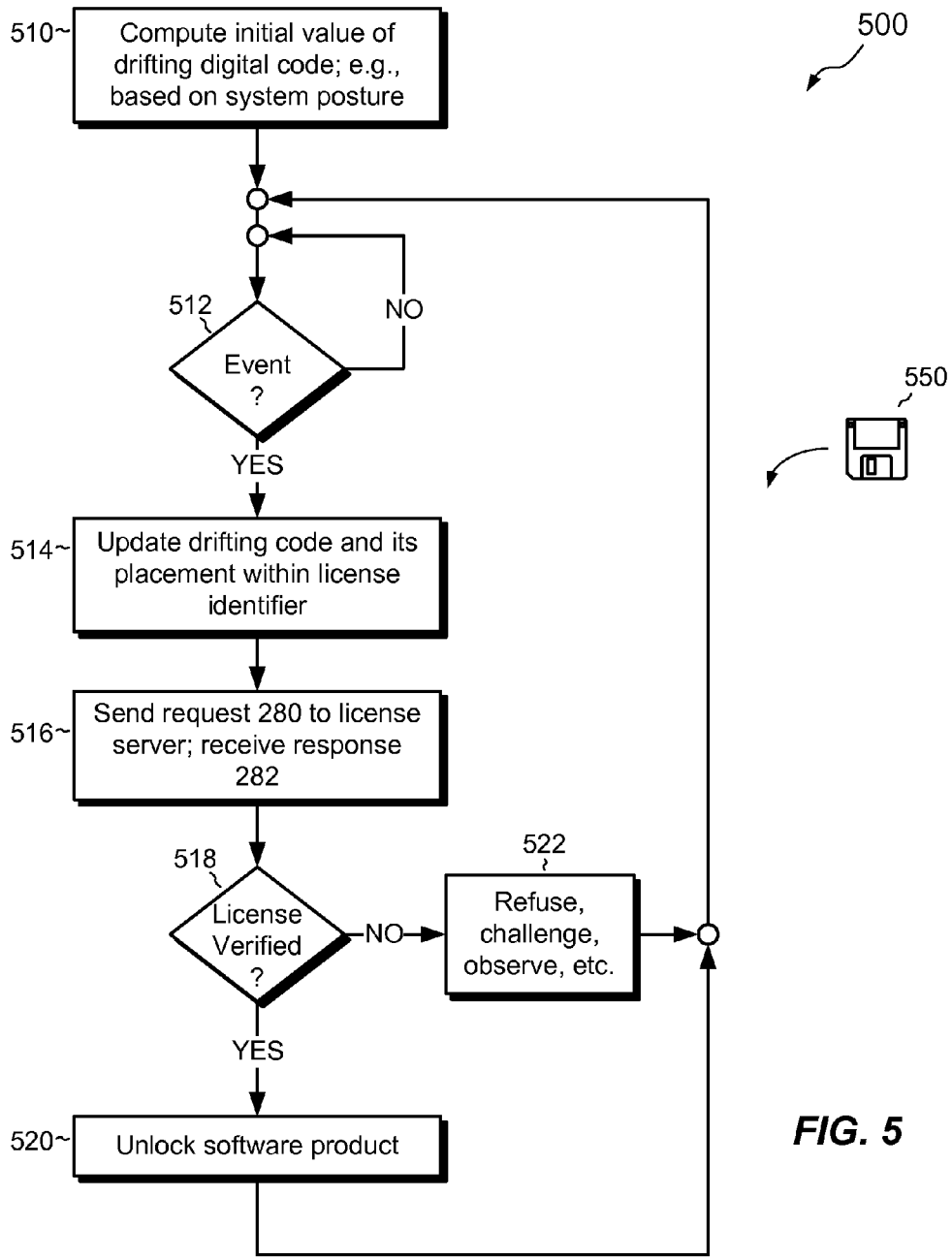
FIG. 5 is a flowchart showing an example process operable by a client machine for performing license checks of a software product with the license server.
Figure 6:
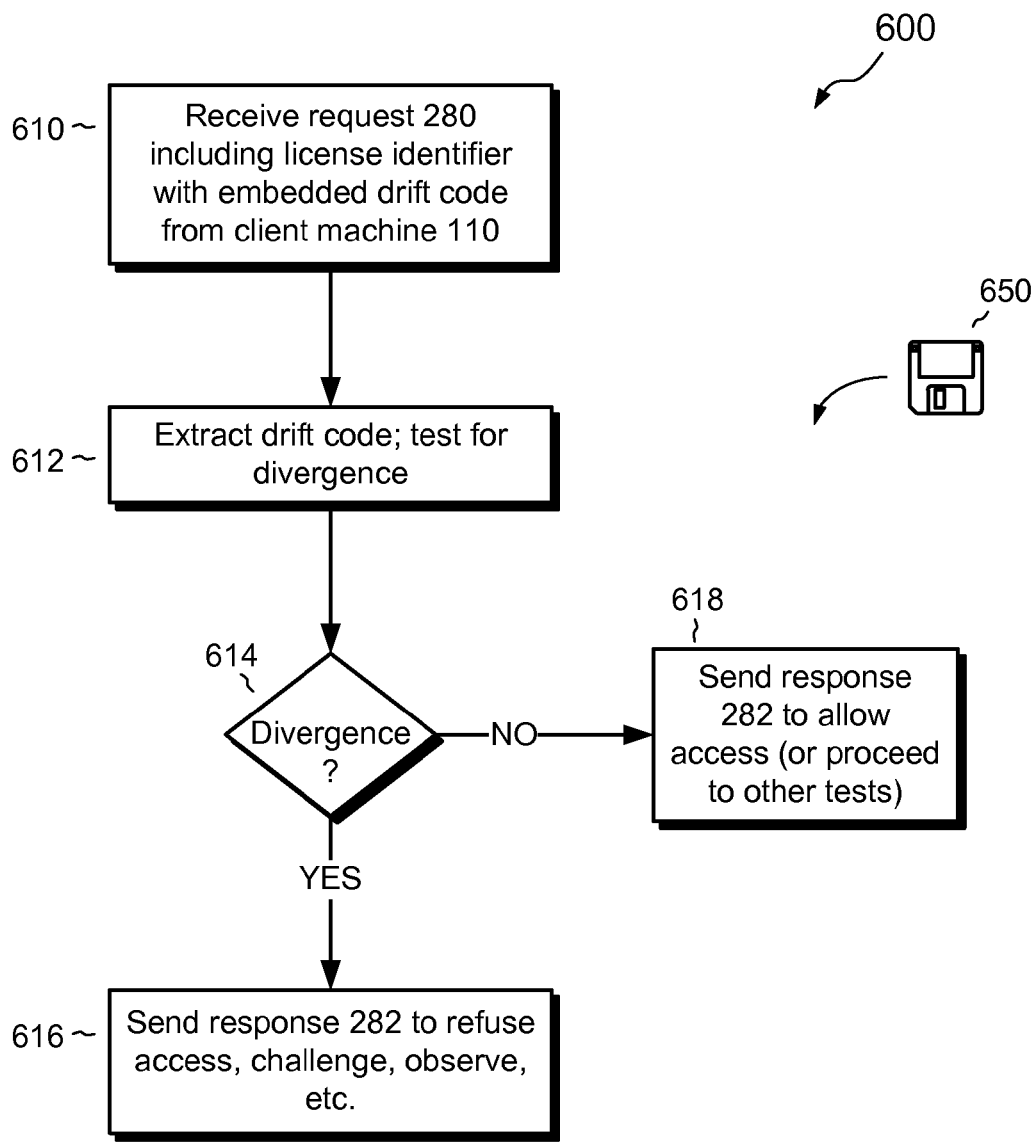
FIG. 6 is a flowchart showing an example process operable by the license server for responding to license checks requested by client machines.

FIGS. 5 and 6 illustrate processes that may be carried out between one or more client machines 110 and a license server 130 in performing license checks. The various acts of each process may be ordered in any suitable way. Accordingly, embodiments may be constructed in which acts are performed in orders different from those illustrated, which may include performing some acts simultaneously, even though the acts are shown as sequential in the illustrated embodiments.

FIG. 5 shows an example process 500 for verifying the license of a software product 112. The process 500 is typically performed by the software constructs of the client machine 110, described in connection with FIGS. 1 and 2, which reside in the memory 220 of the client machine 110 and are run by the set of processors 210.

At step 510, the client machine computes an initial value of the drifting code 222. In some examples, the initial value of the drifting code is computed based on data from information sources 230a-n, which reflect a system posture of the client machine 110.

At step 512, the client machine 110 waits for a license check event. In some examples, events include particular times as measured by the clock 240, which may occur at regular intervals. In some examples, events include registration and/or activation of the software product 112. In some examples, events include the software product 112, or any instance thereof, being started on the client machine 110. Events may include any subset of the above, all of the above, and/or other events.

In response to an event occurring, control proceeds to step 514, whereupon the value of the drifting code 222 is updated. In some examples, updates follow changes that occur in underlying information sources 230a-n. In some examples, updates are computed using a mathematical technique. The mathematical technique may compute each update to the drift code 222 based on one or more previous values of the drift code 222, such that changes accumulate. In some examples, updates are effected using a combination of a mathematical technique and changes in underlying information sources 230a-n.

Also at step 514, placement of the updated value of the drift code 222 within the license identifier is itself updated, so as to confound malicious listeners. The combined string (or data structure, construct, file, etc.) is then typically encrypted. Both the encryption and the placement of the drifting code value are known, or can be ascertained, by the license server 130.

At step 516, the client machine 110 sends a request 280 to the license server 130. The request includes the encrypted information. The license server 130 performs a license check and returns a response 282.

If the license server 130 determines that the license is verified (step 518), the client machine 110 typically unlocks the software product 112, e.g., by allowing full access to the functions of the software product 112. If, however, the license server 130 finds a duplicate drifting code pattern, other actions may be taken, as appropriate under the circumstances.

For example, at step 522, the client machine 110 may deny full access to the functions of the software product 112. The client machine 110 may challenge a user of the software product 112 to provide further information to verify the authenticity of the license. In some instances, the client machine 110 may observe the behavior of the user, for example, to gather information about the user's other activities to facilitate legal action. Control next returns to step 512, where the client machine 110 again waits for a license check event.

FIG. 6 shows an example process 600 for verifying the license of a software product 112. The process 600 is typically performed by the software constructs of the license server 130, described in connection with FIGS. 1 and 2, which reside in the memory 260 of the license server 130 and are run by the set of processors 250.

At step 610, the license server 130 receives a request 280 from a client machine 110 to perform a license check. The request 280 carries with it a license identifier 310 within which a value of the client machine's drift code 222 is embedded.

At step 612, the license server 130 separates the value of the drifting code 222 from the license identifier 310. For example, the license verifier 132 decrypts the request 230 and extracts the drifting code value from the license identifier 310 using information about the encryption and the placement of the drifting code within the license identifier 310, which has previously been coordinated between the license server 130 and the client machine 110. The license server 130 then accesses the drift record 262 of drift codes associated with the received license identifier 310.

At step 614, the license server 130 checks whether the sequence of drifting codes it has received in connection with the license identifier 310 includes a single drift pattern or multiple drift patterns. If the drift detector 134 detects multiple drift patterns, control proceeds to step 616, whereupon the license server 130 sends a response 282 to the client machine 110 from which the request 280 was received, to indicate that license verification failed. In some examples, the response 282 includes instructions to the client machine 110 to challenge the user or to observe the user's behavior. If the drift detector 134 detects only a single drift pattern, control proceeds to step 618, whereupon the license server 130 sends a response 282 indicating that the license check passed. In some examples, where different tests are performed, the license server 130 may submit the passing result to other tests, with a passing response 282 awaiting the other tests producing passing results.

An improved technique has been described for verifying a license of a software product 112. The improved technique includes performing license checks with a license server 130 and passing to the license server 130, as part of the license checks, the value of a drifting digital code 222. The drifting code values form a particular drift pattern, which the license server 130 detects over the course of multiple license checks. If a second copy of the software product 112 is installed, e.g., if the software product 112 is pirated, the second copy will produce drifting code values having their own drift pattern, which differs from that of the initial copy. The license server 130 detects the duplicate copy by observing a divergence in the codes it receives during license checks.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

Having described certain embodiments, numerous alternative embodiments or variations can be made. For example, as shown and described, the license construct 114 runs on the same client machine 110 that includes the licensed software product 112. This is merely an example, however. In other embodiments, the license construct 114 can be proxied to a different device. For example, a single computer can include a single license construct 114 that works in coordination with any number of client machines 110 in an organization to perform license checks on behalf of such client machines with a remote license server 130. A variety of configurations are contemplated.

Also, it has been described that values of the drift code 222 are embedded in license identifiers 310 and included in requests 280. Other drift-related information may also be embedded in license identifiers 310. In some examples, values of the drift code 222 and other drift-related information, if provided, can be regarded as forming a communication channel within the license identifiers 310. In some examples, the communication channel is encrypted differently from the license identifier 310 in which it is embedded.

Also, although techniques have been presented in connection with software licenses, these techniques are not limited to the licensing context per se. For example, the same techniques for creating drifting codes on client machines and verifying the absence of duplicates on a server can be applied to any software program, whether it is licensed or not. In such cases, client machines are issued unique access keys. Drifting codes are embedded in the access keys. The server is considered an access server, and the role of the access server is to detect patterns in drifting keys received in connection with respective access keys to verify that no two client machines are using the same software program with the same access key. It is believed that the use of drifting codes with access keys can be particularly advantageous for software programs performing sensitive (e.g., secret or confidential) activities, as well as for software programs that operate on sensitive data.

Also, the improvement or portions thereof may be embodied as one or more non-transient computer-readable storage media, such as a magnetic disk, magnetic tape, compact disk, DVD, optical disk, flash memory, Application Specific Integrated Circuit (ASIC), Field Programmable Gate Array (FPGA), and the like (shown by way of example as media 550 and 650 of FIGS. 5 and 6). The medium (or media) may be encoded with instructions which, when executed on one or more computers or other processors, perform methods that implement the various processes described herein. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:

1. A method of verifying a license of a software product that runs on a client machine, comprising:
   updating a digital code at different times to produce a sequence of digital code values that exhibit a detectable drift pattern over time;
   sending at least some of the digital code values to a licensing server to perform license checks of the license of the software product,
   upon at least one of the license checks, receiving a message from the licensing server confirming a valid licensed copy of the software product on the client machine, in response to the licensing server detecting no more than one drift pattern among the digital code values the licensing server has received in connection with the license; and
   receiving feedback from the licensing server and varying a rate of change of the digital code based on the feedback,
   wherein each of the digital code values that results from updating the digital code is a multi-bit value, wherein the detectable drift pattern in the sequence of digital code values reflects a change in the multi-bit value over time, and wherein the licensing server detecting no more than one drift pattern among the digital code values includes the licensing server detecting no more than one pattern of changing multi-bit digital code values over time.

2. The method of claim 1, further comprising, upon another of the license checks, receiving an indication from the licensing server that the licensing check has failed, in response to the licensing server detecting greater than one drift pattern among the digital codes the licensing server has received in connection with the license.

3. The method of claim 1, further comprising, prior to updating the digital code, generating the digital code based on system posture information pertaining to the client machine.

4. The method of claim 1, wherein each digital code value has multiple dimensions, and wherein the detectable drift pattern reflects a multi-dimensional change in the multi-bit value over time.

5. The method of claim 3, wherein the system posture information includes any of (i) a hardware fingerprint of an integrated circuit or assembly of the client machine (ii) information pertaining to software running on the client machine, (iii) information pertaining to environmental signals in a vicinity of the client machine, and (iv) information pertaining to user behavior of the client machine.

6. The method of claim 5, wherein updating the digital code to produce the sequence of digital code values includes accumulating updates to the digital code, wherein each update operates on a previous digital code value to make a change relative to the previous digital code value.

7. The method of claim 5, wherein the digital code is updated such that changes in the digital code accumulate at a substantially regular rate relative to a clock of the client machine.

8. The method of claim 5, further comprising monitoring activities of the software product and increasing a rate of change of the digital code based on the activities the software product is performing.

9. The method of claim 5, wherein sending at least some of the digital code values to the licensing server includes embedding the digital code values in a license identifier of the software product.

10. The method of claim 6, wherein the change relative to the previous digital code value is an incremental change relative to a total information content of the digital code.

11. The method of claim 9, further comprising varying a location of the digital code values within the license identifier on different license checks.

12. The method of claim 10, further comprising receiving a message from the licensing server and varying a rate of change of the digital code based on the message.

13. The method of claim 11, wherein the location of the digital code values within the license identifier is varied based on time as measured by a clock of the client machine.

14. The method of claim 11, further comprising receiving feedback from the licensing server, the feedback indicating how the location of the digital code values within the license identifier is to be varied on different license checks.

15. A computing device, comprising:
a set of processors; and
memory, coupled to the set of processors, the memory constructed and arranged to store instructions executable by the set of processors,
wherein the set of processors executing instructions from the memory forms a specialized circuit for verifying a license of a software product that runs on a client machine, wherein the specialized circuit is constructed and arranged to:
update a digital code at different times to produce a sequence of digital code values that exhibit a detectable drift pattern over time;
send at least some of the digital code values to a licensing server to perform license checks of the license of the software product;
upon at least one of the license checks, receive a message from the licensing server confirming a valid licensed copy of the software product on the client machine, in response to the licensing server detecting no more than one drift pattern among the digital code values the licensing server has received in connection with the license; and
receive feedback from the licensing server and varying a rate of change of the digital code based on the feedback,
wherein each of the digital code values that results from updating the digital code is a multi-bit value, wherein the detectable drift pattern in the sequence of digital code values reflects a change in the multi-bit value over time, and wherein the licensing server detecting no more than one drift pattern among the digital code values includes the licensing server detecting no more than one pattern of changing multi-bit digital code values over time.

16. The computing machine of claim 15, wherein the specialized circuit is further constructed and arranged to generate the digital code based on system posture information pertaining to the client machine.

17. The computing machine of claim 16, wherein the system posture information includes a hardware fingerprint of at least one integrated circuit or assembly of the client machine.

18. The computing machine of claim 17, wherein the integrated circuit or assembly includes at least one of a network interface card and a graphics processing unit.

19. The computing machine of claim 17, wherein the client machine is a virtual machine running on the computing device, and wherein the hardware fingerprint of at least one integrated circuit or assembly of the client machine includes the hardware fingerprint of at least one emulated integrated circuit or assembly in a virtual machine environment of the computing device.

20. A non-transitory computer readable medium including instructions which, when executed by a set of processors of a computing device, cause the set of processors to perform a method of verifying a license of a software product that runs on a client machine, the method comprising:
updating a digital code at different times to produce a sequence of digital code values that exhibit a detectable drift pattern over time;
sending at least some of the digital code values to a licensing server to perform license checks of the license of the software product, and
upon at least one of the license checks, receiving a message from the licensing server confirming a valid licensed copy of the software product on the client machine, in response to the licensing server detecting no more than one drift pattern among the digital code values the licensing server has received in connection with the license; and
receiving feedback from the licensing server and varying a rate of change of the digital code based on the feedback,
wherein each of the digital code values that results from updating the digital code is a multi-bit value, wherein the detectable drift pattern in the sequence of the digital code values reflects a change in the multi-bit value over time, and wherein the licensing server detecting no more than one drift pattern among the digital code values includes the licensing server detecting no more than one pattern of chancing multi-bit digital code values over time.

21. The non-transitory computer readable medium of claim 20, wherein the instructions stored on the medium include a set of instructions grouped to form a software construct for managing multiple licenses for multiple software products on the client machine.

22. A method of verifying a license of a software product that runs on a client machine, comprising:
- updating a digital code at different times to produce a sequence of digital code values that exhibit a detectable drift pattern over time;
- sending at least some of the digital code values to a licensing server to perform license checks of the license of the software product;
- upon at least one of the license checks, receiving an indication from the licensing server that the licensing check has failed, in response to the licensing server detecting greater than one drift pattern among the digital codes the licensing server has received in connection with the license; and
- receiving feedback from the licensing server and varying a rate of change of the digital code based on the feedback,
- wherein each of the digital code values that results from updating the digital code is a multi-bit value, wherein the detectable drift pattern in the sequence of digital code values reflects a change in the multi-bit value over time, and wherein the licensing server detecting no more than one drift pattern among the digital code values includes the licensing server values over time.

* * * * *